May 19, 1925.
C. D. DUKE
1,538,784
AUTOMATIC TRAIN CONTROL
Filed Oct. 4, 1924     2 Sheets-Sheet 1
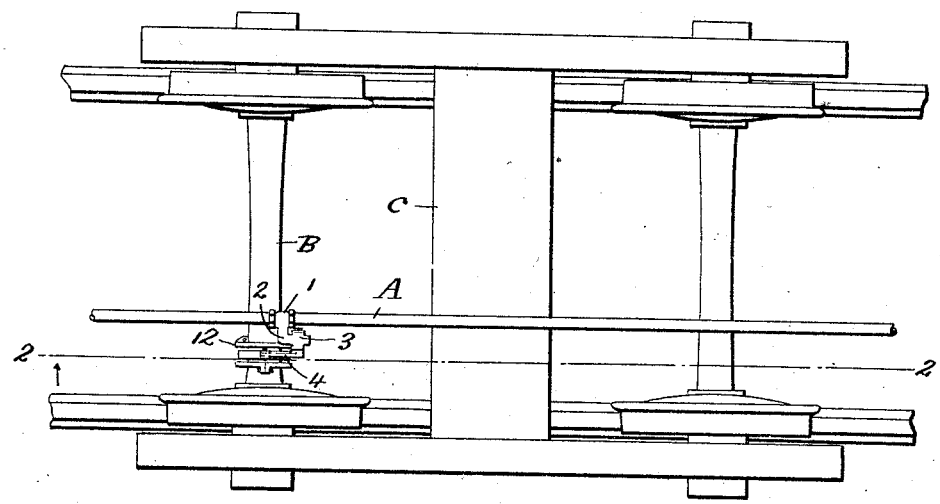
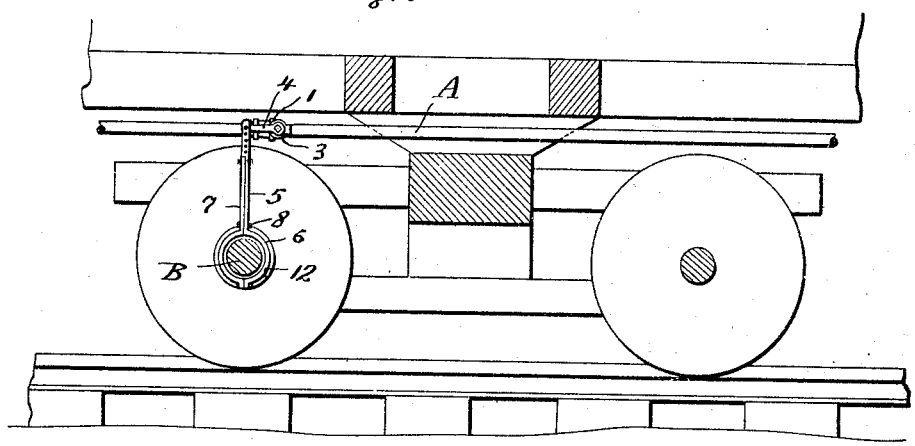
Charles D. Duke
INVENTOR May 19, 1925.
C. D. DUKE
AUTOMATIC TRAIN CONTROL
Filed Oct. 4, 1924
1,538,784
2 Sheets-Sheet 2
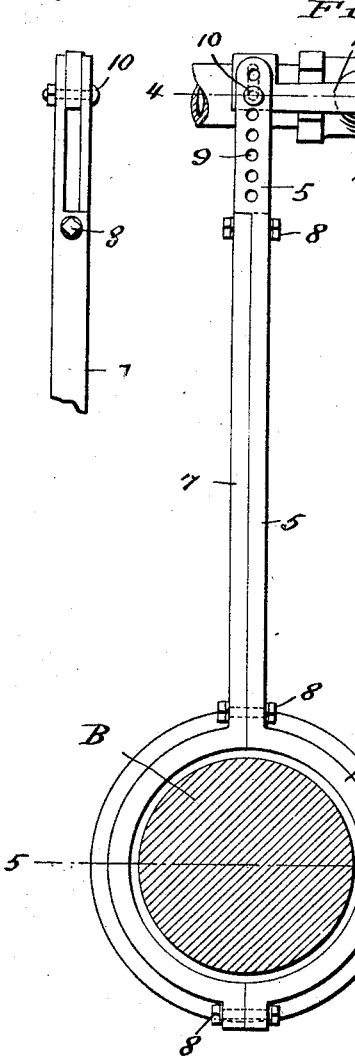
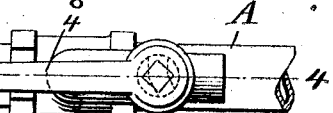
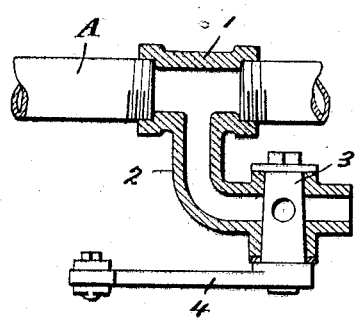
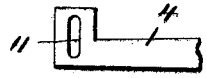
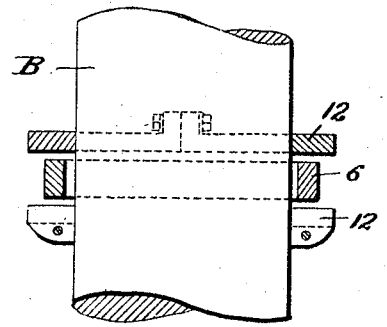
Charles D. Duke,
INVENTOR
BY Victor J. Evans
ATTORNEY
WITNESS:

Patented May 19, 1925.

1,538,784

UNITED STATES PATENT OFFICE.

CHARLES D. DUKE, OF CATLETTSBURG, KENTUCKY.

AUTOMATIC TRAIN CONTROL.

Application filed October 4, 1924. Serial No. 741,622.

*To all whom it may concern:*

Be it known that I, CHARLES D. DUKE, a citizen of the United States, residing at Catlettsburg, in the county of Boyd and State of Kentucky, have invented new and useful Improvements in Automatic Train Controls, of which the following is a specification.

The principal object of this invention is to provide means for stopping a train when a truck thereof is derailed by draining the air line and thus applying the brakes.

Another object of the invention is to so form the parts of the invention that they can be easily applied with but slight change to the train parts.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a plan view of a truck showing the invention in use.

Figure 2 is a section on line 2—2 of Figure 1.

Figure 3 is an enlarged view of the invention.

Figure 4 is a section on line 4—4 of Figure 3.

Figure 5 is a section on line 5—5 of Figure 3.

Figure 6 is a detail view.

Figure 7 is a view of the free end of the arm of the cock.

As shown in these views, I place a coupling 1 in the air line A, said coupling having an angle extension 2 which carries a cock 3 so that when the cock is opened the air line will be drained through the extension. The arm 4 of the cock is attached to a depending piece 5 which is formed with a semi-circular lower part 6 for embracing an axle B of a truck C. A second piece 7 has its semi-circular lower end embracing the other half of the axle B and this piece 7 is fastened to the piece 5 by the bolts 8. The ring formed by the semi-circular parts of the pieces 5 and 7 is of greater diameter than the diameter of the axle so that the ring will not touch the axle when the parts are in normal position. The upper end of the piece 5 is enlarged and is of forked construction and the prongs are each provided with a plurality of holes 9 for receiving a pin or bolt 10 which engages a slot 11 formed in the enlarged outer end of the arm 4. Thus the depending member formed by the pieces 5 and 7 can be adjusted on the arm and said member has a certain amount of movement in relation to the arm without moving the same by means of the pin and slot connection between the member and arm. A pair of rings 12, each formed of two sections which are bolted together, is clamped to the axle, one on each side of the ring part so as to hold the ring part against movement longitudinally of the axle.

From the foregoing it will be seen that if the truck should be derailed the axle B would drop and exert a pull upon the member formed by the pieces 5 and 7 so that the cock would be opened and thus permit the air to drain from the air line so that the brakes on all the cars would be applied and the train brought to a stop. Of course it will be understood that an axle of each truck of each car of a train would be supplied with my invention so that if any truck should become derailed the train would be stopped.

Attention is called to the fact that the ring part does not come in contact with the axle thereof unless a wheel leaves the rail so that there is no wear on the parts. The rings 12 prevent swinging movement of the depending part and the holes 9 permit the device to be adjusted to fit various kinds of cars.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

Means for stopping a train by the derailment of a truck thereof comprising a cock located in the air line, a depending member connected with the arm of the cock and having a ring-shaped lower end embracing an axle of the truck and rings clamped to the axle, one on each side of the ring part for preventing swinging movement of the depending part.

In testimony whereof I affix my signature.

CHARLES D. DUKE.